April 3, 1951 L. L. ASPELIN 2,547,246
AIRPLANE FUEL SYSTEM
Filed July 22, 1948 2 Sheets-Sheet 2

Inventor
LESLIE L. ASPELIN

Patented Apr. 3, 1951

2,547,246

UNITED STATES PATENT OFFICE 2,547,246

AIRPLANE FUEL SYSTEM

Leslie L. Aspelin, Cleveland Heights, Ohio, assignor to Thompson Products, Inc., Cleveland, Ohio, a corporation of Ohio Application July 22, 1948, Serial No. 40,122

14 Claims. (Cl. 244—135)

This invention relates to a multiple fuel pump assembly for an airplane fuel system and particularly deals with such an assembly having a single prime mover in driving relation with a plurality of pumps.

The invention will hereinafter be specifically described as embodied in electric motor-driven pumps submerged within a trap tank of an aircraft fuel cell.

In aircraft fuel systems it is necessary to supply an ample feed of the fuel from the fuel cell or tank to the engine driven pump under all conditions and times of flight.

Certain difficulties must be overcome to insure the aforesaid constant feed to the engine driven fuel pump. At high altitudes the volatile aircraft fuel becomes more gaseous and the formation of gas or vapor bubbles is encountered. Under such conditions, a normal feeding of fuel is not satisfactory because vapor locks or "air locks" form in the fuel line to cause an unsmooth or "rough running" engine. Centrifugal type booster pumps have been successfully employed to "beat out" these vapor bubbles at high altitudes and to pressure a constant supply of fuel to the engine driven fuel pump.

With today's high-speed aircraft, another major difficulty in pressure fuel supply is encountered. The high-speed war-type aircraft of today are frequently called upon to dive at extremely high speeds, to accelerate for extended periods of time at level flight and to perform in inverted flight. When such an aircraft goes into a power dive its acceleration may not only be constantly increasing during the dive, but may exceed the acceleration due to gravity. It is apparent that under such conditions the fuel in a partially filled cell will "climb" to the top and rear portions of the cell, where it is not accessible to the ordinary booster pump which has its inlet disposed adjacent the bottom of the cell. The same problem is encountered in level flight when the aircraft is being accelerated and the acceleration is increased continuously. In this case, the fuel in a partially filled cell collects at the rear portion of the cell, and unless there is sufficient fuel in the cell the booster pump inlet is cleared from a fuel supply. It is also apparent that in inverted flight of the aircraft the booster pump inlet may again be separated from a supply of fuel. When the booster pump or pumps are thus unable to supply fuel, the engine, of course, "runs rough" and fails completely if a fuel supply is not regained within a short time interval.

Therefore, according to this invention, the fuel cell is equipped wth a trap tank for holding a supply of fuel in all positions and conditions of aircraft operation and a plurality of fuel pumps are provided with their inlets so disposed so that one of the booster pumps may be immersed in the fuel under all conditions of aircraft acceleration and in all positions of aircraft flight.

The pump units of this invention are vertically displaced within the trap tank and are selectively operated by an electric motor. For normal or ordinary flight conditions, the booster pump located near the lower wall of the fuel cell is driven by the motor and the upper pump may or may not be connected for operation with the motor. If it is preferred that the upper pump be disconnected during ordinary operation, an acceleration actuated clutch is incorporated for connecting and disconnecting the upper pump and motor. Under conditions of accelerating, acceleration actuated clutch causes the uppermost booster pump to be connected for driving by the motor. In inverted flight condition, gravity effects on the acceleration actuated clutch again connects the uppermost pump for driving by the motor. The pumps and their motor are preferably submerged in the trap tank within the fuel cell to insure a supply of fuel to the pumps, the pumps in turn pressuring the fuel to the engine and the engine driven fuel pump.

It is, then, an object of this invention to provide an improved fuel supply system for aircraft engines.

Another object of this invention is to provide an aircraft booster pump unit effective to pressure fuel under all conditions of aircraft flight and operations.

A still further object of this invention is to provide a booster pump system for supplying pressured fuel to the engine during inverted flight of the aircraft.

Another object of this invention is to provide a fuel system wherein aircraft engines may have a pressured supply of fuel during power dives at accelerations exceeding the acceleration of gravity.

A specific object of this invention is to provide a fuel pump unit for supplying pressured fuel to the aircraft engine during high acceleration flight.

A further object of this invention is to provide an aircraft fuel pump system for supplying pressured fuel to the engine during aircraft deceleration, or during steep climb of the aircraft.

Another object of this invention is to provide a trap tank of such configuration and construction so as to maintain a supply of fuel to the inlet of a booster pump within the fuel cell during all periods of extraordinary flight operation of the aircraft.

Other and further objects of the invention will be apparent to those skilled in the art from the following detailed description of the annexed sheets of drawings which, by way of preferred example only, illustrate one embodiment of the invention.

Figure 1:
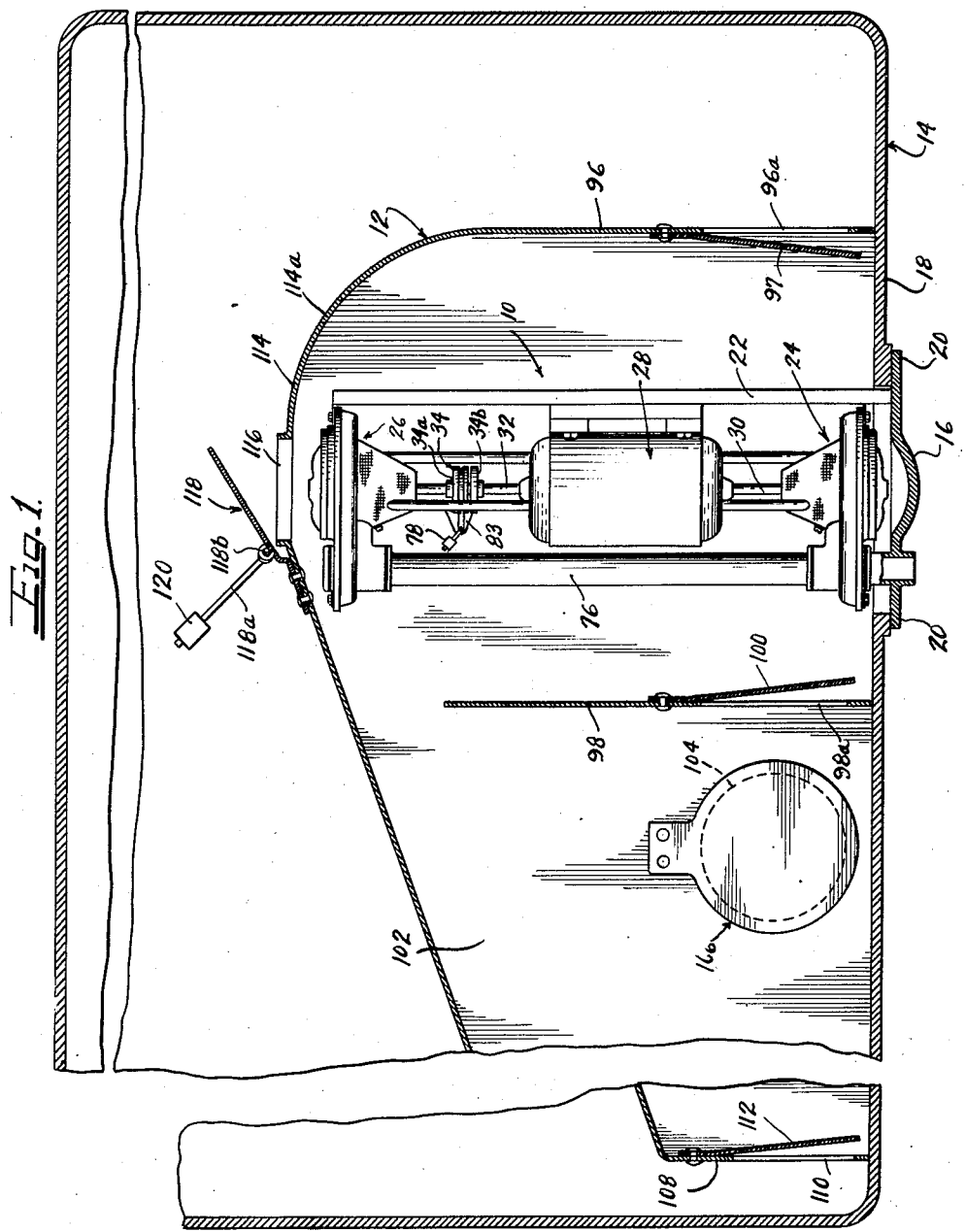
Figure 1 is a side elevational view of the submerged booster pumps and motors, with the fuel cell and trap tank in vertical cross section.

In Figure 1, the reference numeral 10 designates generally a multi-pump electric motor unit according to this invention. The motor unit 10 is located within a trap tank 12 which is also disposed within a fuel cell 14.

The unit 10 is mounted on a base plate 16. The base plate 16 serves as a framework base for mounting the various components of the unit 10 and in addition serves as a bracket for securing the entire unit within the fuel cell 14. With reference to Figure 1, it may be seen that the bottom wall 18 of cell 14 is apertured to receive the unit 10 therethrough. A flanged portion 20 of base plate 16 overlies that portion of the lower wall 14 adjacent the aperture and may be secured thereto.

The members making up the unit 10 are rigidly secured to an upright frame member 22 which is welded to the base plate 16. The operating members of the unit 10 are a lower pump 24, an upper pump 26 and an electric motor 28 which is spaced between the pumps 24 and 26. The motor 28 is connected to lower pump 24 by driveshaft 30 and to the upper pump 26 by driveshaft 32. The upper pump 26 is normally disengaged from the motor 28 by an acceleration actuated clutch 34 which will be described in detail later.

Figure 2:
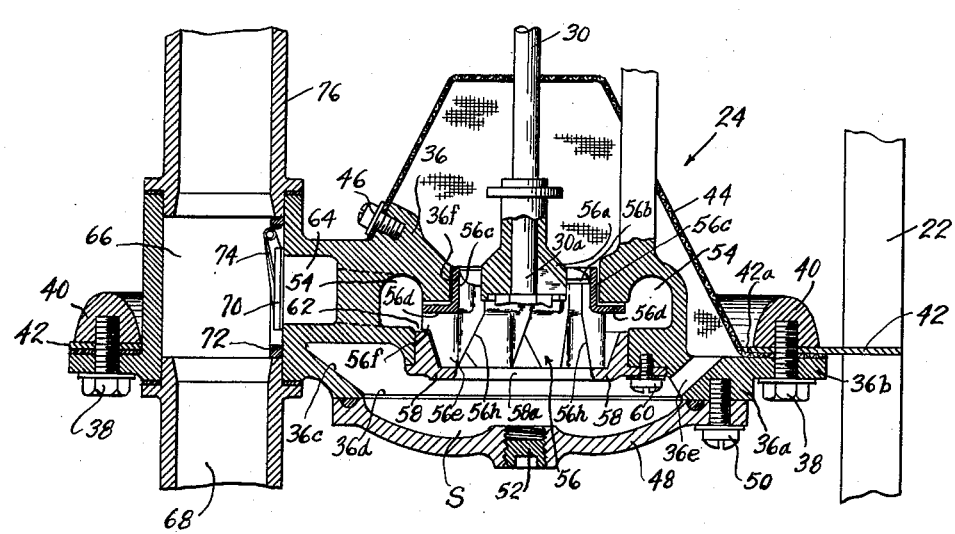
Figure 2 is a transverse sectional view of the lowermost fuel pump.

The lower pump 24 is located adjacent and above the base plate 16 and operates whenever the electric motor 28 is in operation. The lower pump 24, as seen in Figure 2, has a casing 36 the lower part of which has a base 36a with apertured mounting bosses 36b around the periphery thereof receiving cap screws 38 therethrough. Cap screws 38 are threaded into a mounting ring 40 lying on a mounting plate 42 which is secured to the frame members 22. The plate 42 has an aperture 42a for receiving the central part of the pump 24. Interposed between the wall 42 and the base portion 36a is the flanged rim portion of a frusto-conically shaped screen 44 which is also secured to casing 36 by the cap screws 46 threaded into the upper part of the casing 36. The screen 44 functions as a filter for the fuel entering the pump 24.

The base portion 36a of casing 36 has a tapered mouth 36c converging to a large opening 36d at a level below the wall 42. This opening 36d is closed by a concave cap 48 bolted to the base portion 36a as by means of cap screws 50. The concave configuration of cap 48 provides a sump S. The cap 48 has a central boss portion defining a drain outlet closed by a plug 52.

The pump casing 36 has a central opening 36f therethrough and a volute chamber 54 surrounds the central opening. An impeller 56 has a central boss portion 56a secured on the end 30a of the lower shaft 30. Vanes 56b extend radially from the boss portion 56a in spaced relation about the boss portion as shown in Figure 2. These vanes 56b carry a cylindrical collar 56c in spaced radial relation outwardly from the boss portion 56a. The collar 56c has an outturned flange 56d from which depends a plurality of curved impeller vanes 56e in spaced peripheral relationship. These impeller vanes 56e have outer edges in close operating clearance relation with an inlet ring 58, which is secured in the bottom end of the casing 36 as by means of cap screws 60. Inlet ring 58 defines an opening 58a above the sump S.

A series of passages 36e are provided in spaced circumferential relationship to the opening 36d. The passages 36e provide inlet means for the fuel. The fuel is thus passaged into the sump S where it is picked up and pressured by the impeller 56.

The vanes 56e have inner edges 56h converging from the aligned relationship with the wall defining the opening 58a into spaced relation beneath the vanes 56e. The outer edges of the vanes 56e as explained above, have close operating clearance with the inlet ring 58 and have radially extending portions 56f projecting into an annular opening 62 of the volute chamber 54 provided by the casing 36. These vanes 56e and vane portions 56f are effective, when rotated, to centrifugally discharge liquid from the opening 58a into and through the volute chamber 54 where it is passaged through a channel 64 into a discharge cylinder 66 and thence into an outlet pipe 68.

A flap valve 70 is pivotally mounted on a ring 72 seated on the casing around the channel 64. A weak spring 74 acts on the valve 70 to urge the same into position for closing the mouth of the channel 64.

When the impeller 56 is driven by the shaft 30 from the motor 28, pressure of liquid in the volute chamber 54 will be sufficient to open the flap valve 70 and discharge the liquid under pressure into the discharge cylinder 66. The outlet pipe 68 is a part of the base plate 16 being formed by a bossed and apertured section thereof for communication with the fuel line (not shown) of the engine.

As previously stated, the lower pump 24 is driven by the motor whenever the motor 28 is in operation. The upper pump 26 is constructed similarly to lower pump 24, having its intake passages disposed in a similar manner, but due to the reversed mounting of upper pump 26 in the unit 10 these inlet passages open downwardly. Upper pump 26 is connected to the motor 28 by clutch 34 during the aforedescribed accelerated or extraordinary flight operations of the aircraft. However, when pump 26 is operated it pumps the fuel through a connecting line 76 (Figs. 1 and 2) into the same outlet pipe 68 as utilized by the lower pump 24. When the upper pump 26 is thus operated, the lower pump 24 also operates but does not pump fuel because the fuel during the aforedescribed flight conditions has collected at the upper or rear portions of the cell. The fuel pressured by the pump 26 bypasses the lower pump 24 under these conditions by reason of the flap valve 70 in pump 24 being held in closed position by the spring 74.

The acceleration actuated clutch 34 is provided which engages upper pump 26 to motor 28 for operation therewith and which is disengaged during ordinary flight operation of the aircraft. The clutch 34 comprises an upper portion 34a and a lower portion 34b. The lower portion 34b has a central aperture therethrough for receiving the upper shaft 32 of motor 20 and is secured to the shaft 32 for rotation therewith by a set screw 88. The upper clutch portion 34a has a central aperture for receiving the upper pump shaft 90 and is secured to the shaft 90 for rotation therewith by a key 92 which is axially slidable in keyway 92a in pump shaft 90. A central cavity 90a at the lower end of pump shaft 90 receives a reduced portion 32a on the upper end of motor shaft 32 in sliding relationship for the purpose of guiding the engagement of clutch portions 34a and 34b.

Figure 3:
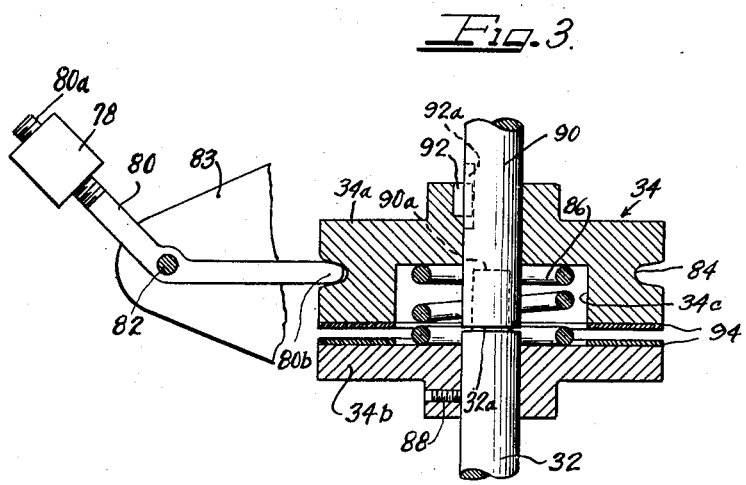
Figure 3 is a similar cross sectional view of the acceleration actuated clutch which connects or disconnects the uppermost booster pump with the motor.

A counterweight 78 acting on an eccentric lever arm 80 holds the upper portion 34a of clutch 34 away from engagement with the lower portion 34b. The lever arm 80 pivots about a pivot arm 82 secured to a bracket 83 mounted on one of the frame members of the unit 10. One end 80a of lever 80 is threaded for adjustment of weight 78 and the other end 80b engages a groove 84 in upper portion 34a. It is apparent in view of Figure 3 that the weight and position of counter-weight 78 may be predetermined so as to suspend the upper clutch portion 34a under normal flying condtions.

A compression spring 86 is disposed within a central cavity 34c in upper clutch portion 34a and urges the upper portion 34a and lower portion 34b apart.

Obviously whenever the aircraft is inverted, is accelerating in level flight or is accelerating in a dive at a rate greater than the acceleration due to gravity the vertical component of bias exerted by the weight 78 or lever arm 80 is decreased and the lever arm 80 rotates in a clockwise direction about the pivot arm 82. The clockwise rotation of lever arm 80 causes a vertical shifting of the upper clutch portion 34a to a lower position whereby the clutch discs 94 are frictionally engaged. This engagement of the clutch parts causes the upper and lower portions thereof to rotate together and thus causes the rotation of the pump shaft 90 and upper pump 26.

It is unnecessary that upper pump 26 be operated during normal flight operation because the inlet of lower pump 24 is immersed in the fuel and pressures a sufficient supply to the fuel line. When the fuel cell 14 is only partially filled, it is obvious that the fuel in the cell will move toward the upper rear portion thereof during a power dive of the aircraft when the aircraft acceleration is exceeding the acceleration of gravity. The fuel in a partially filled tank will also collect at the top of the tank during inverted flight of the aircraft and at the rear of the tank during accelerating level flight. When the fuel is thus unnaturally disposed within the fuel cell, it is apparent that the inlet of upper pump 26 will be immersed within the fuel and a pressured supply of the fuel will be maintained to the fuel line. To further insure the immersion of the inlet of upper pump 26 during abnormal flight conditions, a trap tank 12 is incorporated within the fuel cell and is constructed to trap a portion of the fuel within its walls during extraordinary flight conditions, letting the rest of the fuel collect at the extreme portions of the cell.

The trap tank 12 has a rear wall 96 which is apertured at 96a. This aperture 96a is closed during forward acceleration of the aircraft by the flap valve 97. When forward accelerations have ceased, the flap valve, due to its resilient construction, resumes a position only partially closing the aperture 96a as shown in Figure 1, thus permitting fuel within the trap tank 12 and the fuel cell 14 to seek a common level. A baffle 98 apertured at its lower portion at 98a is positioned transversely within the trap tank 12. A flap valve 100, similar to the valve 96, closes the aperture 98a during periods of deceleration, but is ajar due to its resiliency during ordinary nonaccelerated or decelerated flight. The baffle 98 and valve 100 materially decrease the "swishing" of the fuel back and forth within the trap tank 12. The trap tank 12 has side walls such as 102 which are apertured at the lower portions at 104. A flap valve 106 is located on the inner surface of each of these walls to close an aperture 104 during side-slip motions of the aircraft in either direction. As with flap valves 100 and 96, the flap valve 106 does not completely close the aperture 104 during ordinary flight so as to permit a common fuel level to be maintained within and without the trap tank 12. The trap tank 12 has a front wall 108 of less height than rear wall 12a, front aperture 110 and flap valve 112 which operates to close aperture 110 during periods of deceleration and flight of the aircraft. The upper wall 114 of trap tank 12 inclines upwardly and rearwardly and has a rounded portion 114a joining with the rear wall 96. Upper wall 114 has an aperture 116 therethrough overlying upper pump 26 which is closed during the aforedescribed extraordinary flight conditions by the acceleration actuated trap 118. A flap valve construction similar to that used to close the apertures in the other walls could be used, but as illustrated here the trap 118 is constructed to operate in a manner similar to the aforedescribed clutch 34. The trap 118 has a lever arm 118a fulcrumed at 118b which extends in a forward direction above horizontal. The lever 118a is threaded at its upper end to receive a weight 120 which may be adjustably located along the end of the lever 118a. It is obvious, in view of Figure 1, that if the aircraft accelerated in a forward level flight condition, accelerated in a diving condition of flight, or was inverted in flight, that the trap 118 would close the aperture 116 trapping fuel within the trap tank 12 due to the lessening of the vertical component of bias exerted by the weight 120 and the corresponding clockwise shifting of the lever arm 118a.

From the above descriptions, it will be understood that the invention provides an improved airplane fuel system comprising a multi-pump and motor unit adapted to be submerged in airplane fuel tanks wherein one of the pumps will always be submerged and operating, even during periods of extraordinary flight and while the fuel cell is only partially filled with fuel. The unit will maintain fuel pressure and supply for engine operation under flight conditions where an ordinary fuel pump would be totally inoperative. The pump unit separates gases and vapors from the liquid fuel and pressures the fully liquid fuel into the fuel line and fully serves the further purpose of being a high altitude booster.

It will also be understood that the units of this invention can be completely inoperative without stopping the flow of fuel from the fuel cell to the fuel line, since fuel can always flow through the impeller and casing of the pump. The weak springed flap valve in the discharge cylinder of the pump will readily permit flow whenever there is a suction pull in the fuel line, as when the engine driven fuel pump is operative and the booster pump motor unit is inoperative.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In an aircraft fuel system, a fuel cell, a plurality of pumps disposed in said cell in vertically spaced relationship, a motor for driving said pumps, clutch means connecting the uppermost of said pumps with said motor, said clutch means being selectively operable to couple or to disconnect said uppermost pump and said motor, and means responsive to an acceleration of the aircraft having a vertically downward component exceeding the acceleration of gravity for actuating said clutch means to said coupled condition.

2. In an aircraft fuel system, a fuel cell, a plurality of pumps disposed in said cell having their inlets disposed in vertically spaced relationship, a common outlet for said pumps, a motor for driving said pumps, clutch means connecting the uppermost of said pumps with said motor, said clutch means being selectively operable to couple or to disconnect said uppermost pump and said motor, and means responsive to aircraft acceleration having a vertically downward component exceeding the acceleration of gravity for actuating said clutch means to said coupled condition.

3. In an aircraft fuel system, a fuel cell, a plurality of pumps disposed in said cell in vertically spaced relationship, a motor disposed between said pumps for driving said pumps, means connecting the lowermost pump to said motor for co-rotation, clutch means connecting the uppermost one of said pumps with said motor, said clutch means being selectively operable to couple or to disconnect said uppermost pump and said motor, and means responsive to an acceleration of the aircraft having a vertically downward component exceeding the acceleration of gravity for actuating said clutch means to said coupled condition.

4. In an aircraft fuel system, a fuel cell, a plurality of pumps disposed in said cell in vertically spaced relationship, a motor for driving said pumps, clutch means connecting the uppermost of said pumps with said motor, said clutch means being selectively operable to couple or to disconnect said uppermost pump and said motor and a weighted lever for actuating said clutch means to said coupled condition, said lever being gravitationally biased to clutch disconnecting position under normal flight conditions of the aircraft.

5. In an aircraft fuel system, a fuel cell, a trap tank within said cell, a plurality of pumps disposed in said trap tank in verticaly spaced relationship, a motor for driving said pumps, clutch means connecting the uppermost one of said pumps with said motor, said clutch means being selectively operable to couple or to disconnect said uppermost pump and said motor, and means responsive to an acceleration of the aircraft having a vertically downward component exceeding the acceleration of gravity for actuating said clutch means to said coupled condition.

6. In an aircraft fuel system, a fuel cell, a trap tank within said cell, a plurality of unidirectional pressure responsive valves for trapping fuel within said trap tank, a plurality of pumps having inlets disposed in said trap tank in vertically spaced relationship, a common outlet for said pumps, a motor disposed between said pumps for driving said pumps, clutch means connecting the uppermost of said pumps with said motor, said clutch means being selectively operable to couple or to disconnect said uppermost pump and said motor and a weighted lever for actuating said clutch means to said coupled condition, said lever being gravitationally biased to clutch disconnecting position under normal flight conditions of the aircraft.

7. In an aircraft fuel system, a fuel cell, a pump disposed in said cell, a motor for driving said pump, clutch means connecting said pump with said motor, said clutch means being selectively operable to couple or disconnect said pump and said motor, and means responsive to an acceleration of the aircraft having a vertically downward component exceeding the acceleration of gravity for actuating said clutch means to said coupled condition.

8. In an aircraft fuel system, a fuel cell, a pump disposed in said cell, a motor for driving said pump, clutch means connecting said pump with said motor, said clutch means being selectively operable to couple or disconnect said pump and said motor and a weighted lever for actuating said clutch means to said coupled condition, said lever being normally gravitationally biased to clutch disconnecting position.

9. In an aircraft fuel system, a fuel cell, a trap tank within said cell, said trap tank having an apertured wall, a pump disposed in said trap tank, a motor for driving said pump, clutch means connecting said pump with said motor, said clutch means being selectively operable to couple or disconnect said pump and said motor, a weighted lever for actuating said clutch means to said coupled condition, said lever being normally gravitationally biased to clutch disconnecting position, and valve means responsive to acceleration of the aircraft for closing the wall aperture of said trap tank.

10. In an aircraft fuel system, a fuel cell, a trap tank within said fuel cell, the side walls and top wall of said tank being apertured to permit the passage of fuel therethrough, check valves for said side wall apertures responsive to components of aircraft acceleration in the direction perpendicular to said side walls to close said side wall apertures, closing means for said top wall aperture, means responsive to a vertically downward aircraft acceleration exceeding the acceleration of gravity for actuating said closing means to closed position and a pump disposed within said trap tank for pumping said fuel.

11. In an aircraft fuel system, a fuel cell, a trap tank within said cell, the side walls and top wall of said tank being apertured to permit the passage of fuel therethrough, a plurality of pressure responsive valves constructed and arranged to close said side wall apertures during aircraft acceleration, closing means for said top aperture, and a weighted lever for actuating said closing means to closed position, said lever being gravitationally biased to maintain said closing means in open position under normal flight conditions of the aircraft, and a fuel feed having an inlet disposed adjacent said top aperture.

12. In an aircraft fuel system, a fuel cell, a trap tank within said cell, having side and top walls, the front wall of said trap tank being of less height than the rear wall, the top wall of said tank being inclined upwardly and rearwardly and having a rounded portion adjacent said rear wall, the side walls and top wall of said tank being apertured to permit the passage of fuel therethrough, a plurality of pressure responsive valves constructed and arranged to close said side wall apertures during aircraft acceleration, said top wall aperture being located adjacent said rounded portion, closure means for said top wall aperture, and a weighted lever for actuating said closing means to closed position, said lever being gravitationally biased to maintain said closing means in open position under normal flight conditions of the aircraft, and a fuel pump having an inlet disposed adjacent said top wall aperture.

13. In an aircraft fuel system, a fuel cell, a trap tank within said cell, having side and top walls, the front wall of said trap tank being of less height than the rear wall, the top wall of said tank being inclined upwardly and rearwardly and having a rounded portion adjacent said rear wall, the side walls and top wall of said tank being apertured to permit the passage of fuel therethrough, a plurality of pressure responsive valves constructed and arranged to close said side wall apertures during aircraft acceleration, said top wall aperture being located adjacent said rounded portion, closure means for said top wall aperture, and a weighted lever for actuating said closing means to closed position, said lever being gravitationally biased to maintain said closing means in open position under normal flight conditions of the aircraft, and a plurality of pumps disposed in said trap tank in vertically spaced relationship, the uppermost of said pumps having an inlet disposed adjacent said top wall aperture whereby said inlet is immersed in fuel during periods of accelerated or inverted aircraft operation, a common outlet for said pumps, a motor disposed between said pumps for driving said pumps, clutch means connecting said uppermost pump with said motor, said clutch means being selectively operable to couple or to disconnect said uppermost pump and said motor, and a weighted lever for actuating said clutch means to said coupled condition, said lever being gravitationally biased to clutch disconnecting position under normal flight conditions of the aircraft.

14. In an aircraft fuel system, a fuel cell, a trap tank within said cell, a plurality of unidirectional pressure responsive valves for trapping fuel within said tank, a plurality of pumps having inlets disposed in said trap tank in vertically spaced relationship, a common outlet for said pumps, and a motor for driving said pumps.

LESLIE L. ASPELIN.

No references cited.